(12) United States Patent
Müller et al.

(10) Patent No.: US 6,203,366 B1
(45) Date of Patent: Mar. 20, 2001

(54) SLEEVE FOR RECEIVING A SENSOR, CONNECTED TO THE BUMPER OF AN AUTOMOBILE

(75) Inventors: Harry Müller, Steinheim; Joachim Mathes, Heilbronn; Frank Wöllecke, Ludwigsburg, all of (DE)

(73) Assignee: Valeo Schalter und Sensoren GmbH, Bietingheim-Bissingen (DE)

( * ) Notice: Subject to any disclaimer, the term of this patent is extended or adjusted under 35 U.S.C. 154(b) by 0 days.

(21) Appl. No.: 09/381,908

(22) PCT Filed: Aug. 18, 1998

(86) PCT No.: PCT/EP98/05240

§ 371 Date: Sep. 27, 1999

§ 102(e) Date: Sep. 27, 1999

(87) PCT Pub. No.: WO99/10876

PCT Pub. Date: Mar. 4, 1999

(30) Foreign Application Priority Data

Aug. 21, 1997 (DE) .............................. 197 36 274
Dec. 30, 1997 (DE) .............................. 197 58 075

(51) Int. Cl.⁷ ...................................... H02B 1/01
(52) U.S. Cl. ............................................. 439/561
(58) Field of Search ..................... 439/561, 553, 439/557, 558; 248/27.3, 56, 57, 71

(56) References Cited

U.S. PATENT DOCUMENTS

| | | | |
|---|---|---|---|
| 3,783,435 | * | 1/1974 | Fisher ................................... 439/340 |
| 3,794,278 | * | 2/1974 | Frey, Jr. et al. .................... 248/27.3 |
| 5,658,167 | * | 8/1997 | Shindoh ............................... 439/557 |
| 6,039,602 | * | 3/2000 | Witkowski et al. .................. 439/550 |

FOREIGN PATENT DOCUMENTS

| | | |
|---|---|---|
| 32 029 207 | 4/1984 | (DE) . |
| 34 03 369 | 8/1985 | (DE) . |
| 38 12 182 | 10/1989 | (DE) . |
| 40 33 064 | 4/1992 | (DE) . |
| 42 38 112 | 5/1994 | (DE) . |
| 43 31 795 | 3/1995 | (DE) . |
| 43 33 066 | 3/1995 | (DE) . |
| 44 10 895 | 10/1995 | (DE) . |
| 195 28 474 | 2/1997 | (DE) . |
| 196 01 987 | 7/1997 | (DE) . |
| 196 21 964 | 12/1997 | (DE) . |
| 196 26 291 | 1/1998 | (DE) . |
| WO 97 48 578 | 12/1997 | (WO) . |

* cited by examiner

*Primary Examiner*—Lincoln Donovan
*Assistant Examiner*—Brian S. Webb
(74) *Attorney, Agent, or Firm*—Paul Vincent

(57) ABSTRACT

Automobile distance sensors are becoming increasingly common. These sensors must be connected to the automobile bumper in a permanent fashion and rigidly in a predetermined installation position. According to the invention, the device for receiving an ultrasonic sensor is divided. A first part (3) is cast onto the bumper (1), the second part (11) being preferentially connected to the first part (3) in such a way that it cannot be detached. Advantageous embodiments are aimed at installing the sensor so that it is tilted and relate to preferred methods of connecting the two parts of the device. A second configuration relates to a sensor which is provided with a holder. The holder is particularly suitable for latching into the bumper at the front with a sensor.

8 Claims, 6 Drawing Sheets

SLEEVE FOR RECEIVING A SENSOR, CONNECTED TO THE BUMPER OF AN AUTOMOBILE

BACKGROUND OF THE INVENTION

The invention concerns a receptacle for sensors, in particular transmitters or receivers for measuring distances. These types of sensors have been advantageously installed in the bumpers of motor vehicles as is e.g. described in DE-OS 43 33 066 or DE-OS 195 28 474. Towards this end, the sensors can be either radiation receivers or radiation transmitters or could perform both tasks at differing times. The above mentioned conventional devices normally comprise a sleeve for the sensor at least one portion of which is inserted through a prepared opening in the bumper from the outer side facing away from the vehicle towards the inner side thereof and then anchored in the bumper. Since the position of the sensor must not change during operation, a plurality of measures must be taken to permanently secure the position of the conventional sleeve relative to the bumper.

The invention therefore concerns a mounting configuration as claimed. The purpose of the invention is to simplify mounting and to provide greater assurance that the position of the sensor does not shift while simultaneously simplifying the construction to reduce costs associated with installation of the sensor in the motor vehicle.

This purpose is achieved with the combination of features given in the independent claims.

SUMMARY OF THE INVENTION

A first aspect of the invention consists primarily of a configuration having two pieces with one piece being integrally connected to the bumper and processed thereon during manufacture thereof, and with the other piece of the configuration being connected to the first piece in a non-detachable fashion, in particular, welded. In this fashion, a permanent connection is produced between the two components of the configuration. Since the first component of the configuration is molded onto the bumper during manufacture thereof or is molded therein, it can be made from the same material and have the same color and is securely and permanently mounted thereto. In addition, molding preparations for the bumper are relatively simple, since one can structure the first component in such a fashion that its dimensions perpendicular to the surface of the bumper are relatively small. The molding-on of the first component is therefore relatively easy from a technical point of view. The first component can, however, also be made from a differing material than the bumper such as e.g. a cast or cast-iron body molded with the bumper. In accordance with the invention, the second component is configured as a sleeve and is plugged onto the first component configured as a shoulder and a protrusion projecting through an opening in the sleeve is deformed by welding in such a fashion that the two components are welded to each other or at least such that a spatial deformation is effected on the protrusion of the shoulder in the form of an undercut to secure the sleeve. The second case is e.g. important when the sleeve is not made from plastic rather from metal or from another suitable material. It is also possible within the context of the invention to connect the sleeve to the shoulder in a detachable fashion e.g. by latching.

Another advantage of the invention is that the sleeve which is to be connected to the shoulder e.g. through welding can be adapted to the sensor to be retained so that differing sensors can be mounted in accordance with the invention to the bumper. In this fashion, the configuration is generally not mounted to the bumper in a detachable fashion, but can be easily adapted to differing types of sensors.

Differing methods can be utilized for the connection, in particular welding. For example, the required undercut between the shoulder and the sleeve can be fashioned by heat deformation of the shoulder. In practical applications, plastic has been the material of choice for the sleeve as well as for the shoulder, wherein the plastic components are preferentially connected to each other by ultrasonic welding.

In principle, the invention is suitable for all kinds of sensors intended for the measurement of ambient parameters for regulation devices of a motor vehicle. Since modern bumpers are normally made from plastic, it is particularly advantageous in accordance with the invention to also directly shape the shoulder (first component) of the configuration onto the bumper.

In order to secure the position of the sleeve relative to the shoulder during welding, one can initially latch the sleeve to the shoulder and then weld. It is however also within the framework of the invention to mold a shoulder on the inner surface of the bumper facing the vehicle which extends towards the vehicle and to attach the sleeve to this shoulder and to the bumper in a detachable fashion e.g. by means of latching. Of primary importance is the fact that one component of the sleeve configuration is molded to the bumper.

A particularly simple configuration of the sleeve has the mounting shoulder provided with at least one mounting protrusion which projects through an opening in the sleeve. This protrusion can be welded to the surrounding regions of the sleeve or be positively connected by means of heat deformation. The protrusion can however also be latched to the sleeve in a detachable manner.

A particularly good alignment of the sleeve relative to the shoulder and thereby relative to the bumper is achieved when a plurality of protrusions project evenly from the surface of the bumper and are distributed about a circular periphery so that the sleeve is secured relative to the shoulder at a plurality of locations to ensure stability for the mounting with respect to transverse torques acting on the sleeve from arbitrary directions.

The sleeve also has latches which are, per se, of a conventional construction for removable reception of the sensor. The retroactive mounting of the sleeve to the bumper also facilitates use of the sleeve as an adapter for differing types of sensors, as already mentioned above.

In order to improve the radiation path of the ultrasound or radar radiation irradiated by the sensor, the bumper is provided, with a circular hole through which the sensor radiates. The circular nature of the hole is however not absolutely necessary. Slot-shaped openings can also be provided e.g. for positively influencing the lobes of the sensor radiation.

In certain cases, a hole in the bumper is not necessary. One can simply reduce the thickness thereof locally, so that it acts as a collimator in the vicinity of the sensor and provides little resistance to the radiation given off by the sensor, e.g. radar radiation. Radar radiation can also be generated in such a fashion that it is not hindered by e.g. an increased bumper thickness.

In particular when the bumper has an opening, it is advantageous to border the edge thereof with a ring rib and to sidewardly connect the protrusions penetrating past the surface of the bumper to the outer surface of the ring-shaped rib. This increases the strength of the protrusions. In addition, the end surfaces of the ring ribs can simultaneously serve as seating surfaces for the sensor and/or the sensor sleeve. A different and optionally additional seating possibility for the sleeve is given when the shoulder and/or plastic component has spacer ribs for seating the sleeve in an inserted state. The spacer ribs can thereby be simultaneously integrally connected to the protrusions which serve for mounting the sleeve. In order to increase the seating surface of the sleeve, same can be given a peripheral console (collar), which is supported on the spacer ribs. In order to uniquely determine the angular position of the sleeve relative to the bumper, an advantageous improvement to the invention. Provides that, the protrusions can only penetrate through the associated openings at a particular angular orientation of the sleeve so that the sleeve cannot be mounted or latched in an incorrect installation orientation relative to the mounting shoulder.

In the event that the spacer ribs have differing heights, the sleeve and the sensor can be mounted to the bumper at differing predetermined tilts relative thereto.

In a second aspect of the invention, the holder is not joined to the bumper in a preferentially non-detachable fashion via a shoulder, rather the holder is latched into the bumper. Towards this end, as in the embodiments described above, the plate can be curved and have a flat portion only in the region of the bumper. It is important that the plate has an area which is substantially larger than its thickness. The shape of the plate is otherwise relatively unimportant within the context of the invention. This facilitates snapping the holder, already equipped with a sensor, into the plate. The detachable connection thereby is directly effected between the holder and the plate. An additional shoulder on the plate or on the bumper is not necessary. In accordance with the invention, it is clearly possible to retroactively introduce the sensor into the holder from the rear or from the front side of the plate. An exchange of the sensor is therefore, still possible. In addition, the holder is only mounted in a detachable fashion so it can be exchanged along with the sensor or alone. In addition, the holder can serve as an adapter for sensors having differing dimensions. In this case, a holder substantially having changed inner dimensioning and being equipped with a sensor can be substituted for the previous holder, i.e. the previous holder can be latched out and the new holder latched in.

If one would like to insert the holder from the front, an advantageous improvement in the invention is given by the features combined in a dependent claim. The installed holder is particularly attractive when it is provided with a peripheral protrusion, since the geometrical configuration is quite simple in this case. With the feature combination given in this dependent claim, the latching protrusions engage the backside of the plate and are therefore not visible to the observer. A particularly large degree of flexibility is given when the shoulder protrusion penetrates through the sleeve and is deformed to engage behind the penetration opening thereof. The sensor is thereby latched to the holder using latching means. It can also however be attached to the holder in a detachable manner using other means (e.g. screws or bolts) or, alternatively, attached to the holder in a non-detachable fashion. In this case, it can also be advantageous to integrally unite the holder and the sensor housing so that the latching means and the holding means in accordance with the above mentioned features are directly added to the sensor housing or unified integrally therewith.

Occasionally, the mass-produced bumpers can have tolerance deviations with respect to each other, particularly with regard to their thickness. In order to prevent the snapping connection from being insufficiently tight with thin bumpers, the plastic sleeve has a plurality of protrusions distributed about the periphery of a circle, the sleeve having a cylindrical shape and comprising latches at an end facing away from the shoulder for detachable mounting of the sensor. The latching fingers supported on the backside of a plate are thereby configured in such a fashion that they simultaneously exercise a force acting to pull the front end of the holder towards the backside when the latching fingers are spread out. In this fashion, the peripheral protrusion is firmly pulled against the edge region of the opening and the front side of the bumper. The feature combination in accordance with a dependent claim provides for particularly simple latching arms. Latching arms are thereby extruded onto the outer surface, and end slightly before the protrusion on the holder.

An improvement of the invention given by the feature combination of another dependent claim is advantageous in order to limit the possible pivot angle for the latching arms and to thereby prevent the latching arms from buckling over in response to loading of the holder.

In order to simplify the automatic joining together of the sensor and the holder, an improvement in the invention is proposed in accordance with the features combined in an additional dependent claim. The holder and the sensor thereby have a surface which is configured in such a fashion that a joining together is not possible in a state of rotational nonalignment. In order to simplify the structure of these components, the latching means for joining together the sensor and the holder also function to secure against rotation. For example, the holder latches can only effect a latching of the holder when they engage into the corresponding holder groove. Conversely, an insertion of the sensor into the holder can be prevented by fashioning blocking walls on the sensor which abut against the ends of the latches at improper rotational orientation to prevent insertion of the sensor into the holder at an improper rotational orientation. The invention also concerns a suitable method for mounting a sensor into the bumper. As already mentioned above, a differing sequence for joining together the components is possible. In accordance with the invention, it is also possible to latch the sensor into a holder latched into the bumper. Insertion can thereby, in principle, be initiated from the front or from the backside of the bumper. Front installation is however preferred, since the backside of the bumper is difficult to access when the motor vehicle is assembled.

BRIEF DESCRIPTION OF THE DRAWINGS

An embodiment of the invention is described below with reference to the drawing.

DESCRIPTION OF THE PREFERRED EMBODIMENT

Figure 1:
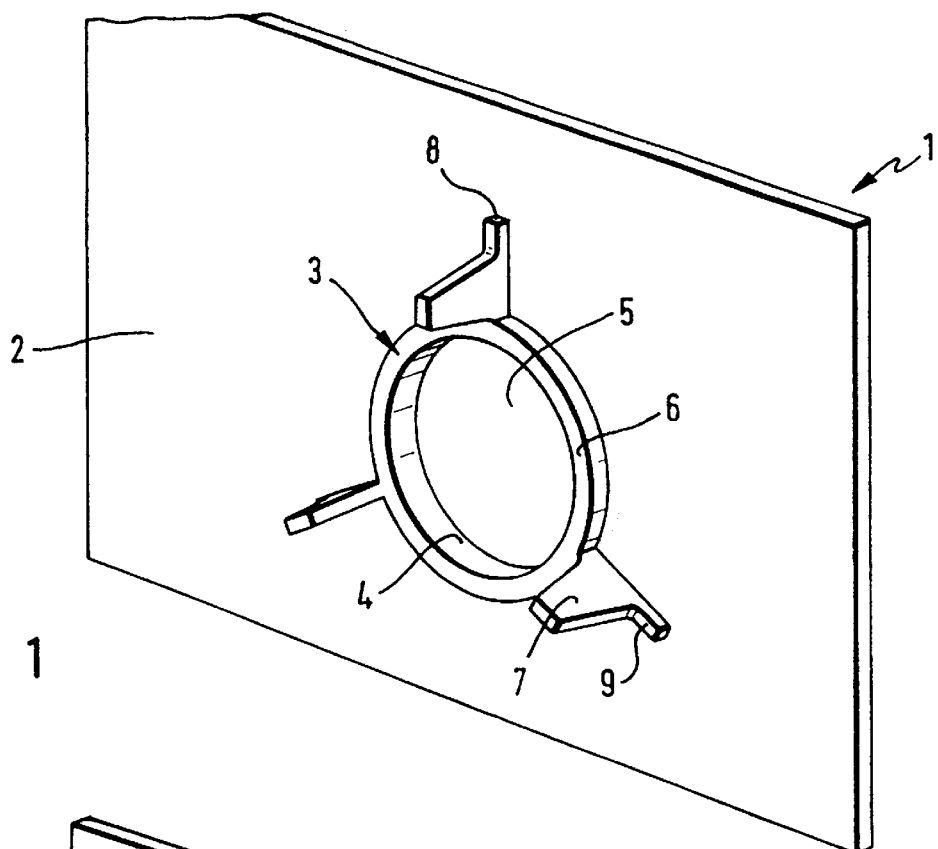
FIG. 1 shows the shoulder on the inner surface of the bumper in a first embodiment of the invention.

FIG. 1 shows a portion of the bumper 1 having a mounting shoulder molded onto the inner surface 2 thereof. In the assembled state, the mounting shoulder extends from the inner surface of the bumper towards the vehicle. The mounting shoulder 3 has a ring rib 4 surrounding a hole 5 in the bumper 1. The end surface 6 of the ring rib 4 simultaneously serves as a seating surface for the sleeve (not shown in FIG. 1).

Three protrusions 7 extend perpendicularly from the inner surface 2 of the bumper 1 and seat, at a lower section, on the outer surface of the ring rib 4, wherein the joined materials provide for a higher degree of strength.

The protrusions 7 extend in a radially outward direction into spacer ribs 8 the front surfaces 9 of which are substantially parallel to the inner surface 2 of the bumper 1 and serve as seatings for a peripheral console of the sleeve.

Figure 2:
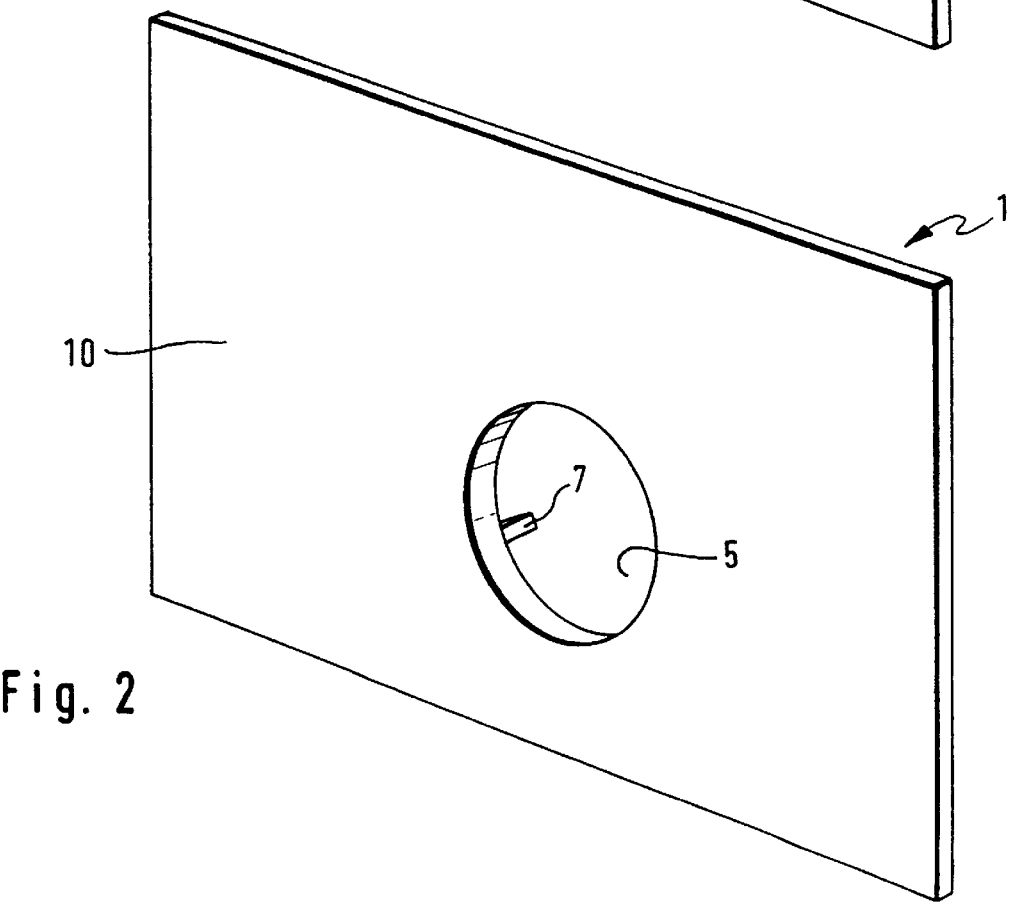
FIG. 2 shows the same shoulder as in FIG. 1 from the outer surface of the bumper.

FIG. 2 shows the outer surface of a section of the bumper 1 corresponding to the section in accordance with FIG. 1 and illustrating the side of the bumper not visible in FIG. 1. A protrusion 7 projecting beyond the inner surface (not shown in the figure) is visible in FIG. 2 through the hole 5. The bumper thereby has a very smooth outer surface 10 which can be easily worked and, in particular, painted.

Figure 3:
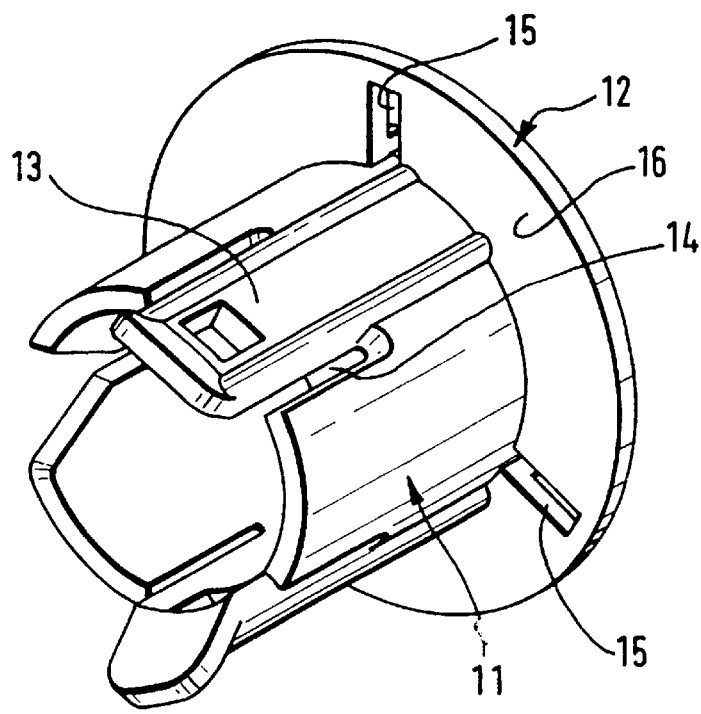
FIG. 3 shows the sleeve from a first view angle.

FIG. 3 shows the sleeve 11 having a peripheral console 12 on its end facing the inner surface 2 of the bumper 1. The sleeve 11 has resilient latches 13 fashioned by slots 14 in the hollow cylindrical wall of the sleeve 11 and extending to the console 12. Three openings 15 in the sleeve are important for mounting the sleeve 11 to the mounting shoulder 3 and are evenly distributed about the periphery of a circle. The protrusions 7 according to FIG. 1 can pass through these openings and engage behind the console 12.

Figure 4:
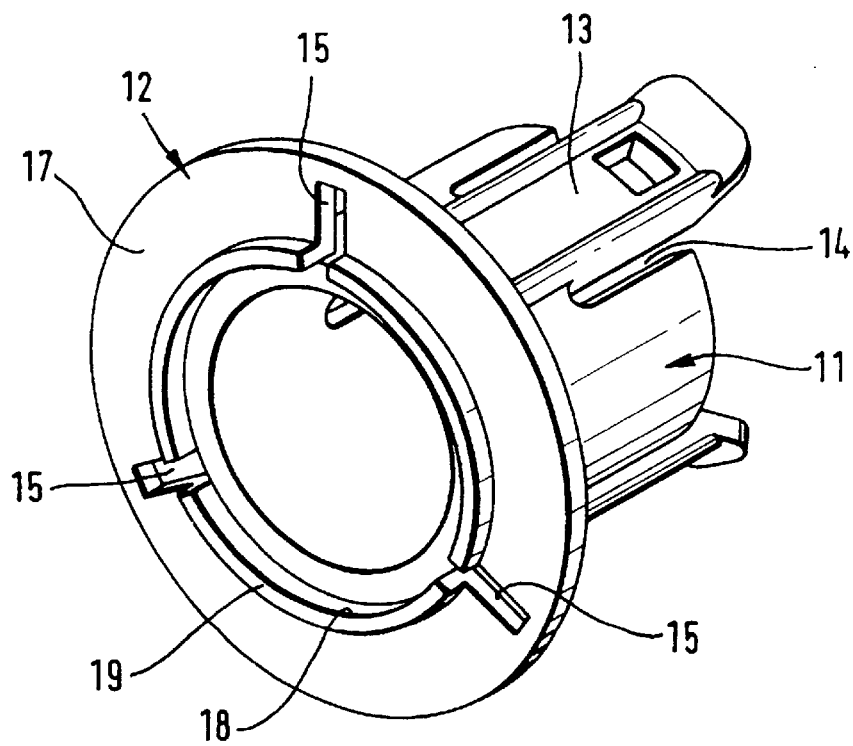
FIG. 4 shows the sleeve from a second view angle.

FIG. 4 shows the front surface 17 of the console 12 of the sleeve 11 in accordance with FIG. 3 lying across from the back surface 16. A ring collar 18 can also be seen in FIG. 4 the end surface 19 of which serves to support the sleeve 11 on the end surface 6 of the ring ribs 4 (FIG. 1).

The function of the latches 13 is described in connection with DE-OS 195 28 474 the complete disclosure of which is hereby incorporated by reference and is not further elaborated at this point.

Figure 5:
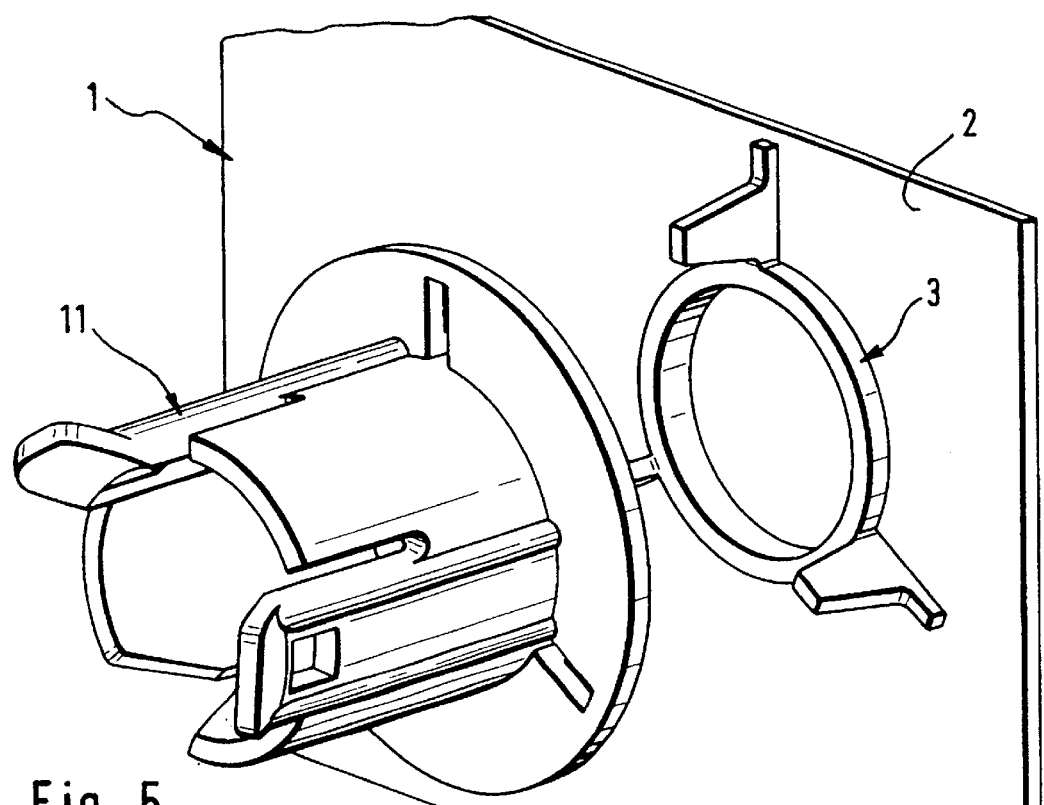
FIG. 5 shows the sleeve relative to the mounting shoulder in a separated representation.
Figure 6:
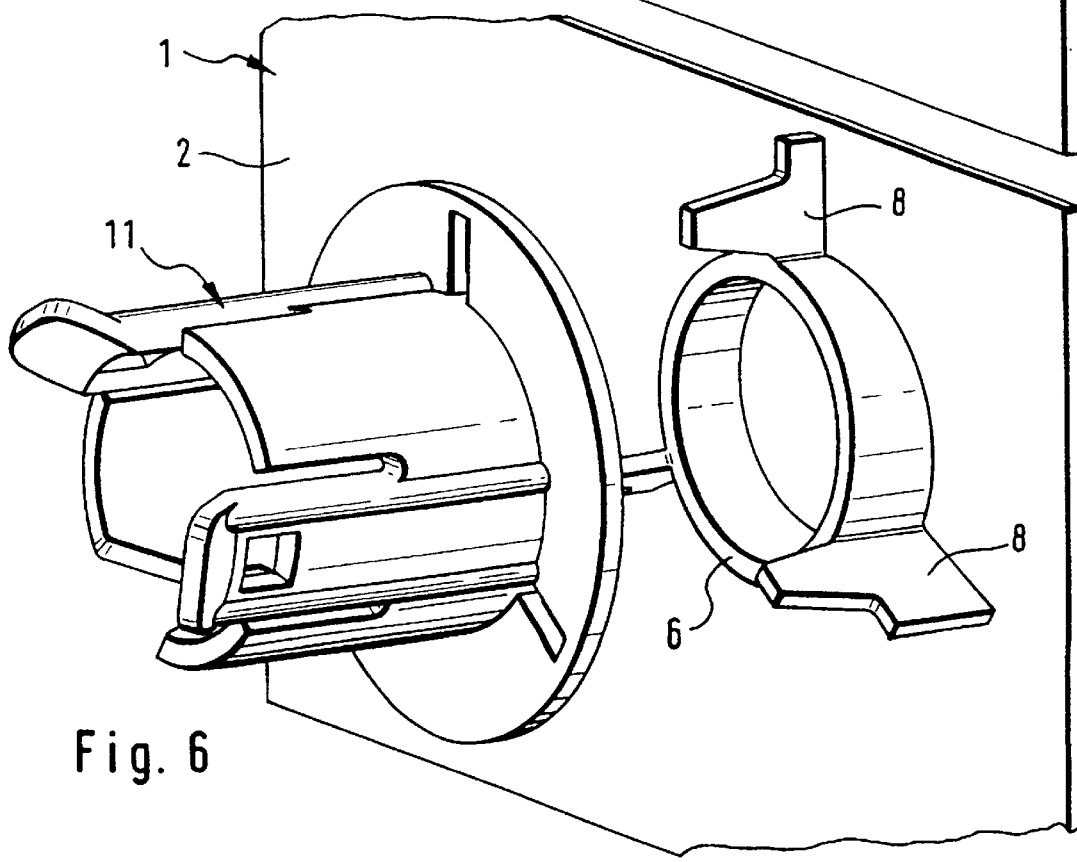
FIG. 6 shows the sleeve according to FIG. 5, wherein the attachment shoulder has an end surface which is titled relative to the inner surface of the bumper.

FIG. 5 shows the shoulder 3 in a separated representation with the sleeve 11 facing in the direction of installation prior to joining these two components of the mounting configuration in accordance with the invention. FIG. 6 substantially shows the same configuration as in FIG. 5. The particular difference is that the spacer ribs 8 have differing heights so that, if desired, the sleeve 11 can be placed onto the inner surface 2 of the bumper 1 tilted relative thereto. The plane defined by the end surface 6 is thereby tilted relative to the inner surface 2 of the bumper 1. One thereby obtains a particular tilt for the sensor relative to the pavement surface, which is desirable for a plurality of reasons.

Figure 7:
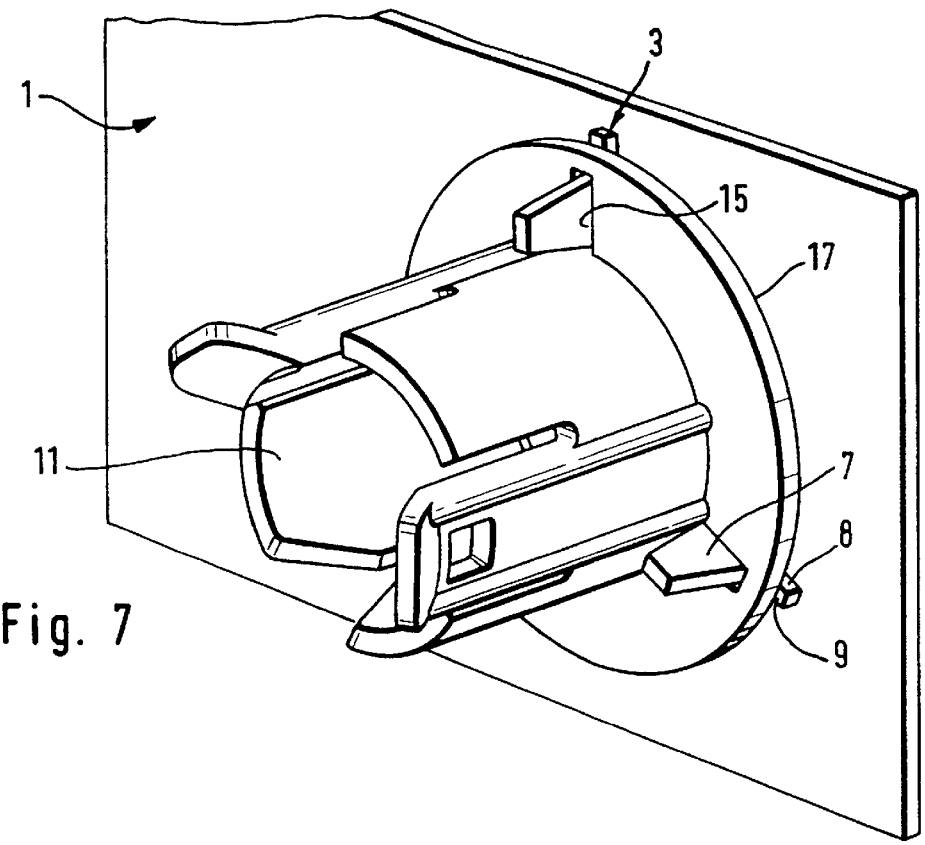
FIG. 7 shows the sleeve placed onto the shoulder according to FIG. 5.
Figure 8:
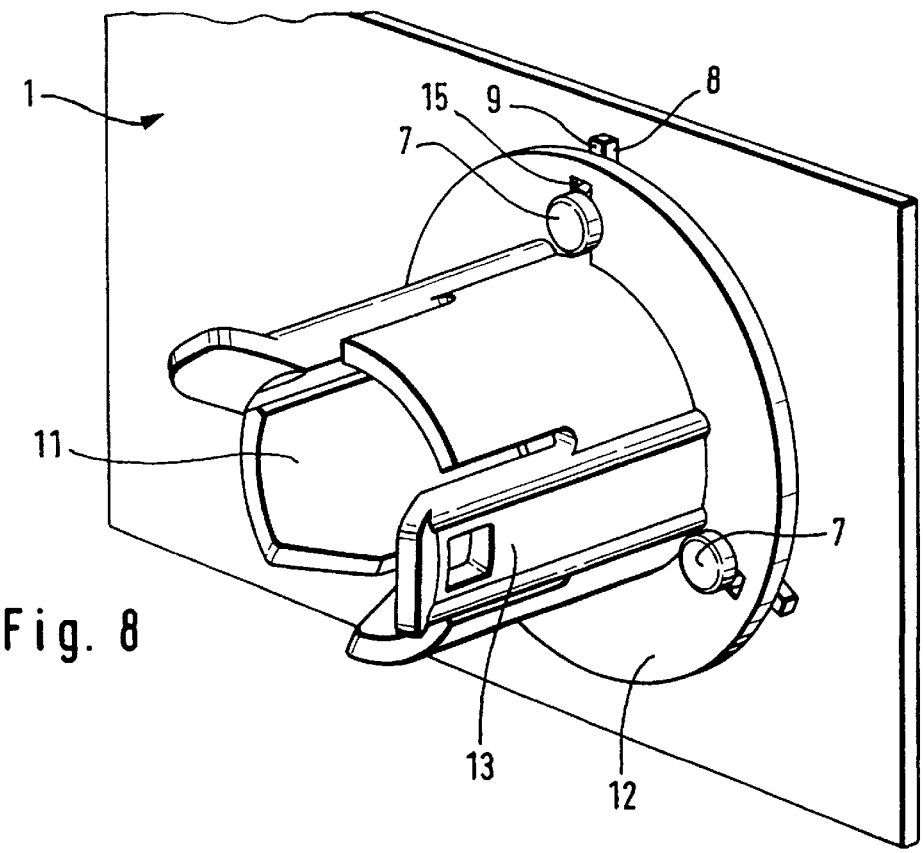
FIG. 8 shows the deformation of the shoulder protrusions according to FIG. 7.

FIG. 7 shows the sleeve 11 mounted onto the mounting shoulder 3, wherein the protrusions 7 penetrate through the openings 15 in the sleeve 11. The front surface 17 of the console 12 simultaneously seats on the front surface 9 of the spacer ribs 8. In addition, the end surfaces 19 of the ring collar 18 seat on the end surfaces 6 of the ring rib 4 (not shown in FIG. 7). Finally, FIG. 8 shows the deformation of the protrusions 7 by means of ultrasonic welding or another suitable shaping procedure. The protrusion material can thereby melt onto the plastic of the sleeve at the abutment surface. This is however not necessary for the invention.

The invention can be summarized in other words as follows:

One would like to mount an ultrasonic transmitter in a vehicle (e.g. in the bumper). The proposed solution consists essentially of a single piece holder having a flange formed thereon which is plugged behind an opening in the bumper on which small ribs have been extruded and the ribs are subsequently deformed using ultrasonic welding in such a fashion as to cause a positive connection between the deformed ribs and the holder or flange.

For fixing its position, the holder has an additional collar on the flange which guarantees coaxial alignment between the holder and the bore hole in the bumper. The flange has openings through which the ribs, extruded onto the bumper or the bumper molding and having arbitrary cross sections, can penetrate to subsequently be deformed by means of ultrasound to generate a positive connection.

Should the ribs have shoulders, shaped in a particular plane, an additional directional orientation can also be integrated therein to allow the holder to thereby be introduced onto the bumper or the bumper molding at differing tilts.

Advantages:

simple assembly a holder for all positions a visually pleasing solution.

The configuration of shoulders on the ribs as described above facilitates use of a standard holder having differing spatial orientations. This leads to a planning and administrative advantage through reduction in the number of holders needed for equipping the vehicle independent of the curvature of the bumper.

Figure 9:
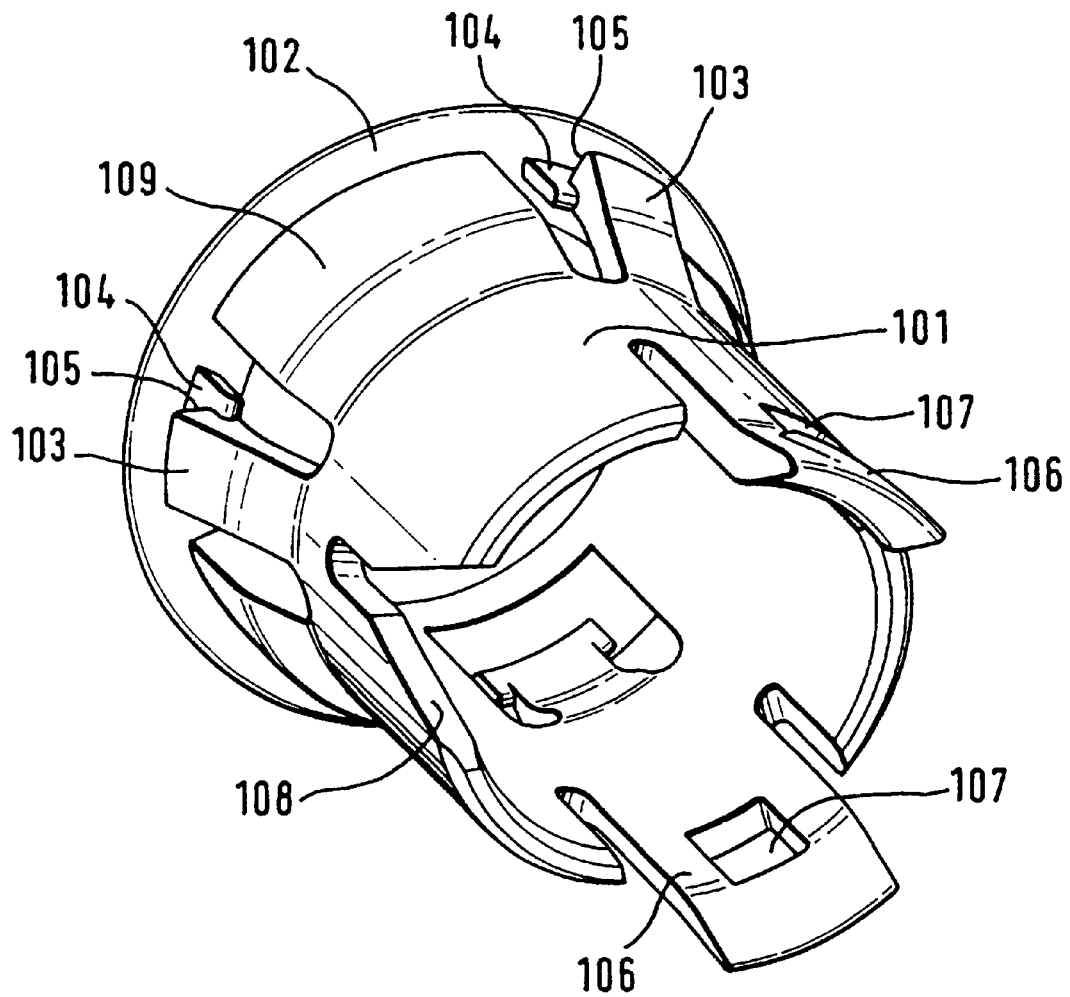
FIG. 9 shows a first view of a second embodiment of the invention.
Figure 10:
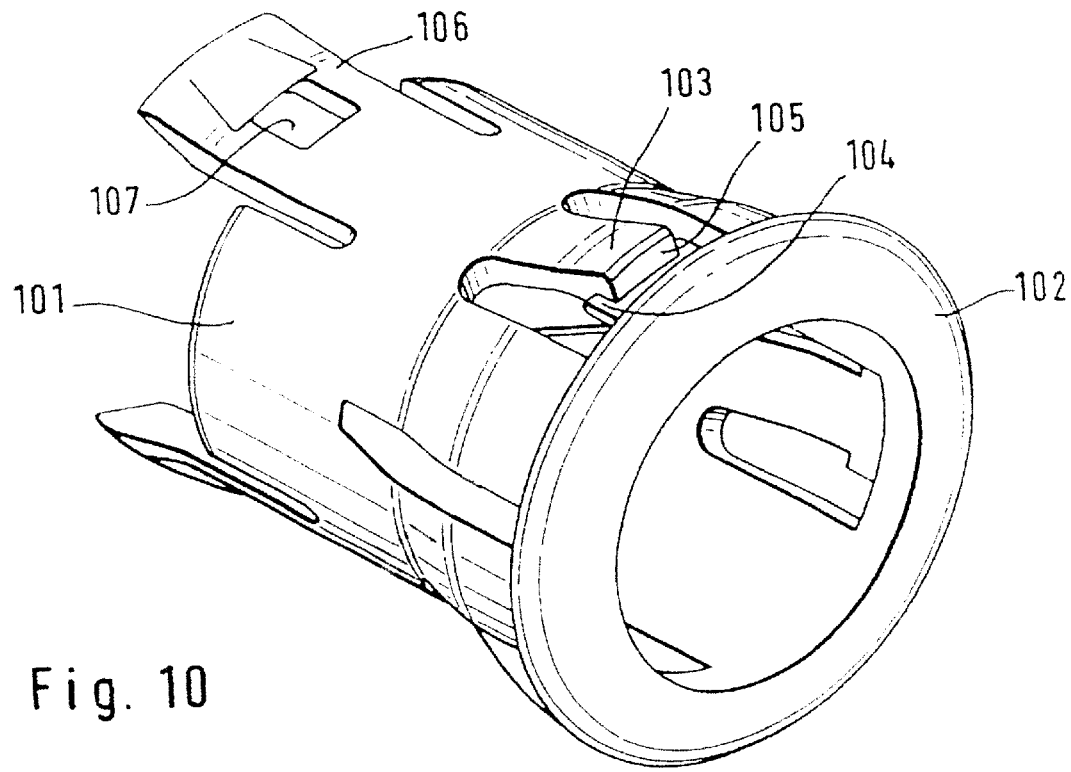
FIG. 10 shows a second view of a second embodiment of the invention.
Figure 11:
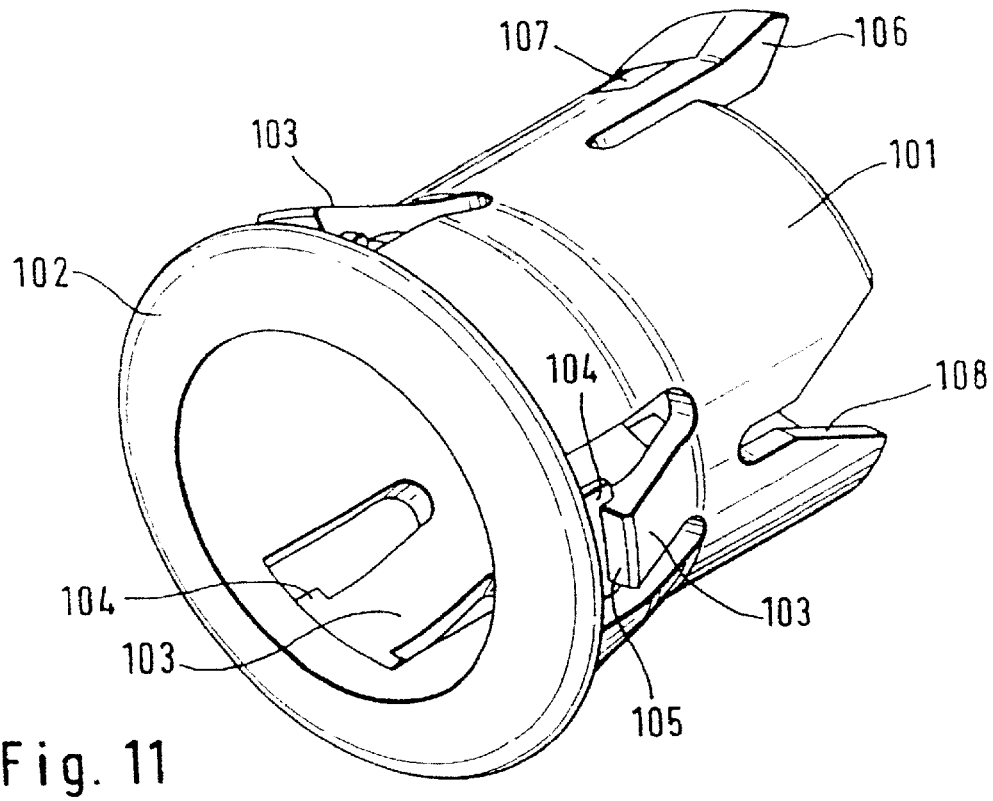
FIG. 11 shows a third view of a second embodiment of the invention.

A second embodiment of the invention is described with reference to FIGS. 9 through 11. FIG. 9 shows the holder 101 which substantially has the shape of a hollow cylinder. The holder bears, on its end facing the front side of the bumper (not shown), a peripheral protrusion 102 which is supported on the edge of the opening (not shown) through which the holder is inserted in the plate.

The elastic outwardly slanted latching protrusions 103 are important for the invention. In a neutral position, these protrusions are slanted sufficiently outwardly as to subtend an outer circular periphery having a larger diameter than the opening through which the holder 101 is inserted up to the stop 102 (peripheral protrusion). In other words, when the holder is inserted through the opening, the resilient latching protrusions are pivoted inwardly by the inner contours of the opening and spring apart as soon as they pass the edge of the opening. This locks the holder 101 to the plate as the latching protrusions engage behind the edge at the backside of the opening. The thickness of the latching protrusions is thereby chosen in such a fashion that they have enough space to be able to deflect in an inward direction relative to the edge of the opening even when the sensor is snapped into place (not shown). In this fashion, it is possible to insert the holder, equipped with the sensor, through the opening after which it latches therein.

Stops 104 are disposed or molded onto the ends of the latching protrusions 103 which abut against the inner edge of the opening when the latching protrusions 103 pivot out to thereby limit the outwardly directed pivot motion of the latching protrusions 103 in the installed state of the holder 101.

The surfaces on the ends of the latching protrusions facing the peripheral protrusion 102 have a radially inwardly increasing tilt. The engagement surfaces 105 defined thereby therefore support themselves on the inner edge of the opening in the plate when the latching protrusions 103 pivot out during the latching procedure and thereby pull the holder 101 further through the opening until the peripheral protrusion 102 securely abuts on the edge of the opening at the front side of the bumper. In this manner, the holder 101 automatically clamps onto the surrounding region of the opening. The upper section 106 of the holder is somewhat slanted conically in an outward direction to thereby center the holder relative to the opening. Latching means are provided on the end of the holder 101 facing the observer in FIG. 9 as latches 106 having latch openings 107. The latches are bent during insertion of the sensor. The sensor (not shown) has protrusions associated with the latch openings 107 which are surrounded by the latch openings 107 in the latched-in state to hold the sensor. In the embodiment, the holder 101 has two latches 106. However, additional latches can be utilized or only one single latch can be provided for. A sideward guide slot 108 fashioned in the holder 101 can be seen in FIG. 11 which serves for rotational alignment so that a sensor inserted into the holder 101 having an associated guiding protrusion is automatically introduced in the proper rotational position.

The holder in accordance with the invention is often configured in such a fashion that it can be inserted into the plate opening when equipped with a sensor and snapped to the plate at this location.

Within the framework of the invention, it is also conceivable that the thicknesses of the latching protrusions and stops are chosen in such a fashion that the holder can be latched in the opening without a sensor with the sensor being subsequently inserted into the latched holder such that its outer contours serve for additionally spreading out the latching protrusions and thereby for an automatic securing of the latching connection.

We claim:

1. A mounting for attaching a sensor to a plastic component of a motor vehicle comprising:
    a shoulder molded as an integral piece onto the plastic component, said shoulder having at least one protrusion; and
    a sleeve for accepting the sensor, said sleeve plugged onto and connected to said shoulder at at least one connection location, said sleeve having an opening through which said protrusion passes, a free end of said protrusion being deformed to engage behind a surrounding edge region of said opening to attaching said sleeve to said shoulder.

2. The mounting of claim 1, wherein the plastic component is a bumper and the sensor is a distance sensor using ultrasound.

3. The mounting of claim 1, wherein said sleeve is made from plastic and a plurality of protrusions are evenly distributed about periphery of a circle and protrude substantially perpendicularly from an inner surface of the plastic component, wherein said sleeve has a substantially hollow cylindrical shape and comprises latches at an end thereof facing away from said shoulder for a detachable mounting of the sensor.

4. The mounting of claim 1, wherein the bumper has a circular hole at which said shoulder is molded.

5. The mounting of claim 1, wherein said sleeve comprises a peripheral collar having an end surface and at least one of said shoulder and the plastic component comprises spacer ribs against which said collar end surface seats.

6. The mounting of claim 5, wherein said spacer ribs have heights selected in such a fashion that said collar seats on said spacer ribs with a predetermined tilt relative to the plastic component.

7. The mounting of claim 1, wherein a dimension of said protrusion and a dimension of said opening are selected in such a fashion that said sleeve can be mounted to said shoulder only at a predetermined rotational orientation.

8. The mounting of claim 1, wherein said shoulder has a ring rib having an end surface facing away from the plastic component, said ring rib end surface serving as a seating surface for an end surface of said sensor facing the plastic component.

* * * * *